E. H. COOLEY.
EGG BEATER.
APPLICATION FILED MAY 15, 1915.
1,155,215.
Patented Sept. 28, 1915.
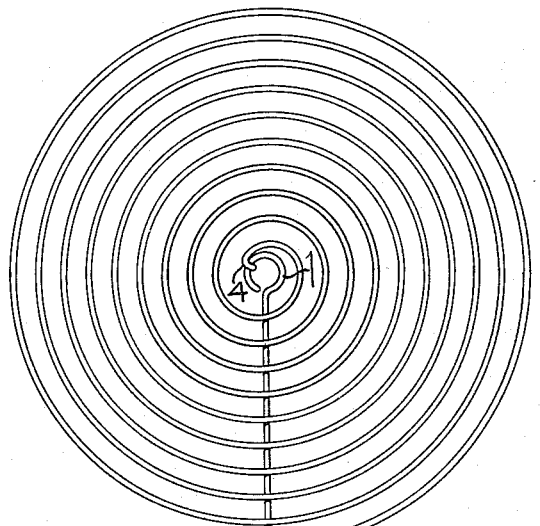
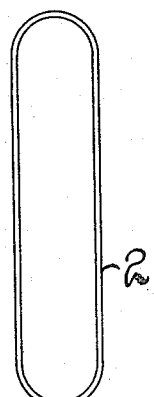
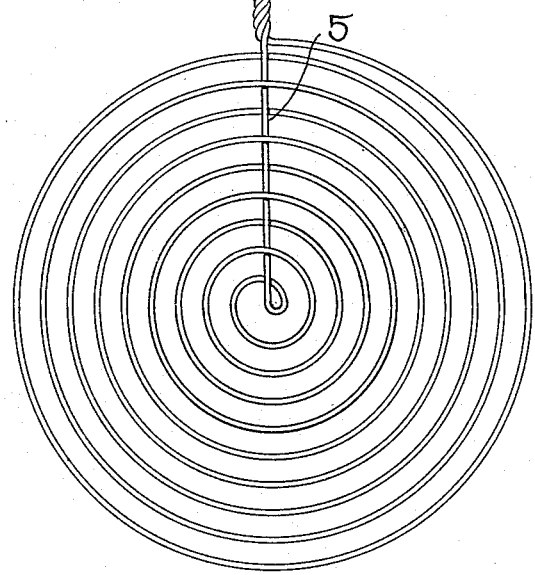
Inventor
E. H. Cooley
Witnesses
Robert M. Sutphen
Benj. R. Newcomb
By Edward P. Moore
Attorney

UNITED STATES PATENT OFFICE.

EDWARD H. COOLEY, OF TAKOMA PARK, MARYLAND.

EGG-BEATER.

1,155,215.   Specification of Letters Patent.   Patented Sept. 28, 1915.

Application filed May 15, 1915. Serial No. 28,369.

*To all whom it may concern:*

Be it known that I, EDWARD H. COOLEY, of Takoma Park, in the county of Montgomery and State of Maryland, have invented certain new and useful Improvements in Egg-Beaters; and I do hereby declare the following to be a full, clear, and exact description of the invention, such as will enable others skilled in the art to which it appertains to make and use the same.

My invention relates to an egg beater of the stirrer or whipping type.

One of the objects of my invention is to provide an egg beater of the character above set forth which is so constructed as to be sanitary, easily manipulated, and easily manufactured at small cost.

Another object of my invention is the provision of a novel form of whipping end formed of spirally coiled wire and joined in such a manner that the convolutions of the spiral are under expanding tension.

A still further object of my invention consists in providing a novel means of reinforcing the convolutions of the spiral forming the whipping end, by weaving a portion of the wire forming the handle between the convolutions of the spiral.

In the drawings annexed hereto and forming a part of this specification, and in which I have illustrated preferred forms of my invention: Figure 1 is a plan view of one form of egg beater. Fig. 2 is a plan view of another form of egg beater.

Referring particularly to Fig. 1, the egg beater is formed of a continuous piece of wire which is bent at one end to form an eye 1, which also forms the center of the whipping end of the beater. The shank of this eye is extended to form the handle portion 2, the upper end of which is open and the other end of the wire is helically coiled about the shank above-mentioned, so as to form a stiff handle. At the point 3, the wire branches off and is thence spirally wound in a flat coil until the end 4 reaches the center of the eye 1. This end 4 is then hooked over onto the eye 1 to fix the spiral. The length of wire of which the spiral is formed is tempered to form a spring so that when the end 4 is fastened to the eye 1 the convolutions of the spiral are under an expanding tension. This is a particularly advantageous feature inasmuch as the whipping action of the beater depends upon the vibration of the convolutions of the spiral.

Referring particularly to Fig. 2, in which I have shown a modified form of beater, the spiral is formed of a length of wire which is coiled from the center outward and is woven over a straight length of wire integral therewith, and the two ends of the wire are twisted to form the handle portion as in the case of that type shown in Fig. 1. It will be seen that in this construction the handle portion 2 is constructed in the same manner as that type shown in Fig. 1, but the spiral portion proceeds from the center to the periphery and every other spiral crosses above or below the straight length 5. This construction reinforces the spiral against bending, but does not detract from the vibrating effect which the convolutions have when the beater is used. The spiral forming the whipping end, in this modification, is also coiled under tension so that the convolutions thereof, if the spiral was cut at any one point, would tend to spring apart. The advantage of this construction over that shown in Fig. 1 is that, due to the reinforcement by the length 5, the entire article may be made of thinner stock.

While I have herein shown and described specific embodiments of my invention, it is to be understood that I do not wish to be limited thereto except for such limitations as my claims import.

I claim:

1. An egg beater or stirrer consisting of a handle portion and a whipping end formed of a length of wire, the said whipping end consisting of spirally arranged convolutions wound so as to be under an expanding tension, substantially as described.

2. An egg beater or stirrer consisting of a handle portion and a whipping end formed of a length of wire, the said whipping end consisting of spirally arranged convolutions wound so as to be under an expanding tension, and a length of wire extended for engagement with each of said convolutions to support the latter, substantially as described.

3. A beater or stirrer including a whipping end consisting of convolutions formed from a length of wire coiled under tension, substantially as described.

4. An egg beater consisting of a handle portion and a whipping end formed of a length of wire, the said whipping end consisting of spirally arranged convolutions, and means integral with said length of wire and extending to the center of said whipping end to reinforce said convolutions, substantially as described.

In testimony whereof I have signed this specification.

EDWARD H. COOLEY.

Copies of this patent may be obtained for five cents each, by addressing the "Commissioner of Patents, Washington, D. C."